(12) United States Patent
Ohkubo

(10) Patent No.: US 7,242,419 B2
(45) Date of Patent: Jul. 10, 2007

(54) LIGHT QUANTITY ADJUSTMENT DEVICE AND METHOD AND EXPOSURE APPARATUS

(75) Inventor: Kazunobu Ohkubo, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 272 days.

(21) Appl. No.: 10/969,978

(22) Filed: Oct. 22, 2004

(65) Prior Publication Data

US 2005/0088509 A1 Apr. 28, 2005

(30) Foreign Application Priority Data

Oct. 23, 2003 (JP) ............................. 2003-363205

(51) Int. Cl.
*B41J 2/435* (2006.01)

(52) U.S. Cl. ...................................... 347/236; 347/246

(58) Field of Classification Search ........ 347/236–240, 347/246–255
See application file for complete search history.

(56) References Cited

U.S. PATENT DOCUMENTS 6,034,710 A * 3/2000 Kawabe et al. ............. 347/236

FOREIGN PATENT DOCUMENTS

JP 8-142406 A 6/1996
JP 10-811 A 1/1998

* cited by examiner

*Primary Examiner*—Hai Pham
(74) *Attorney, Agent, or Firm*—Sughrue Mion, PLLC

(57) ABSTRACT

An adjustment quantity required for adjusting a quantity of light emission is computed based on an image density calculated from a measured quantity of light emission and sensitivity characteristics of an exposed photosensitive material to be exposed so that the image density of each of the light emitting devices within a device row becomes substantially equal to each other and the quantity of the light emission is adjusted based on the computed adjustment quantity.

25 Claims, 9 Drawing Sheets

PRIMARY SCANNING DIRECTION

LIGHT QUANTITY ADJUSTMENT DEVICE AND METHOD AND EXPOSURE APPARATUS

CROSS-REFERENCE TO RELATED APPLICATION

This application claims priority under 35 USC 119 from Japanese Patent Application No. 2003-363205, the disclosure of which is incorporated by reference herein.

BACKGROUND OF THE INVENTION

1. Field of the Invention

The present invention relates to a light quantity adjustment device and method, and an exposure apparatus. More particularly, the present invention pertains to a light quantity adjustment device and method, wherein a quantity of light emitted from an exposure light source including a plurality of light emitting devices is adjusted with respect to each light emitting device, and to an exposure apparatus, wherein a quantity of light emitted from an exposure light source including light emitting devices is adjusted with respect each light emitting device, thereby permitting a photosensitive material to be exposed to the quantity-adjusted light.

2. Description of the Related Art

An organic field-effect light emitting device incorporating fluorescent organic substances in a light emitting layer, which is referred to as organic electroluminescence (EL) device, is easier to make than other types of light emitting devices, and can be formed in a thin, light weight structure. In view of such advantages, such light emitting devices have been researched and developed as devices for a thin display panel. Further, since high performance organic EL devices have recently been obtained, which rival light emitting diodes (LED) in terms of emission luminance, light emission efficiency, durability, and the like, research has been undertaken to apply such devices in exposure apparatuses for exposing a photoreceptor such as silver halide photoreceptor.

An exposure apparatus using organic EL devices comprises, as shown in FIG. 11, for example, a plurality of sets (two sets in FIG. 11) of device rows arranged in a secondary scanning direction, wherein each set of device rows include light emitting sections 80 emitting light in red (R), green (G) and blue (B) colors which are arranged on a color basis in a primary scanning direction. In FIG. 11, the light emitting sections are indicated by the reference numeral 80 with alphabet suffix R, G, B added for distinction.

Not only an organic EL device including a plurality of light emitting sections but also an exposure head incorporating a plurality of light emitting devices suffers from a drawback that the quantity of emission varies from device to device due to manufacturing tolerances, thus resulting in uneven exposure.

In order to solve the above drawback, JP-A No. 8-142406 has proposed a method for adjusting light emission intensity wherein a light emission intensity distribution of each light emitting device is measured; the measured distribution is sliced with a standard light emission intensity value and the width of light emission intensity for each device is calculated; and an adjustment value for the driving energy is set so that each light emitting device represents an equal width of light emission intensity.

Further, JP-A No. 10-811 has proposed a technology for adjusting a quantity of light of each light emitting device, wherein a density distribution of a solid image (patch image) recorded on a photosensitive material is measured; then adjustment data is obtained to make constant the density value for each light emitting device; and the quantity of light emitted from each light emitting device is adjusted.

However, there is a problem that equalizing the luminescence intensity width of each light emitting device cannot prevent uneven exposure, since the obtained density distribution of the image becomes continuous with a continuous gradation photosensitive material such as silver halide photosensitive material. Another problem is that although the uneven exposure can be prevented with a continuous-gradation photosensitive material if adjustment is made so that the density value of the solid image becomes constant, the density distribution of a fine image must be measured with a high degree of precision, which requires very expensive measuring instrument, resulting in an increase in cost.

SUMMARY OF THE INVENTION

The present invention has been made in the light of the aforementioned problems, and provides a light quantity adjustment device and method, wherein a quantity of light emitted from an exposure light source including a plurality of light emitting devices is adjusted with a high degree of precision with respect to each light emitting device without using an expensive image density measuring system. The present invention also provides an exposure apparatus wherein a quantity of light emitted from an exposure light source is adjusted with a high degree of precision, thereby making it possible to prevent occurrence of unevenness of exposure when a photosensitive material is exposed to the light.

According to a first aspect of the present invention, there is provided a light quantity adjustment device, comprising: a light quantity measuring section for measuring a quantity of light emission from each of plural light emitting devices in a light emitting device array in which the plurality of light emitting devices are arranged in a primary scanning direction to form a device row and a plurality of the device rows are arranged in a secondary scanning direction; an adjustment quantity computing section for computing an adjustment quantity required for adjusting the quantity of the light emission based on an image density calculated from the measured quantity of the light emission and sensitivity characteristics of a photosensitive material to be exposed so that the calculated image density of each of the light emitting devices in a device row becomes substantially equal to each other; and a light quantity adjustment section for adjusting the quantity of the light emission based on the computed adjustment quantity.

According to a second aspect of the present invention, there is provided a light quantity adjustment device, comprising: a light quantity measuring section for measuring a quantity of light emission from each of a plurality of light emitting devices in a light emitting device array in which a plurality of light emitting devices are arranged in a primary scanning direction to form a device row and a plurality of the device rows are arranged in a secondary scanning direction; an adjustment quantity computing section for computing an adjustment quantity required for adjusting the quantity of light emission based on an image density calculated from the measured quantity of the light emission and sensitivity characteristics of a photosensitive material to be exposed so that the calculated image density of each of the light emitting devices in a device row becomes substantially equal to each other; and a light quantity adjustment section for adjusting the quantity of the light emission based on the computed adjustment quantity, wherein: the adjustment quantity computing section computes the adjustment quantity so that the calculated image density of each of the light emitting devices in a device row becomes substantially equal to a calculated minimum image density of the light emitting devices of that device row.

According to a third aspect of the present invention, there is provided a light quantity adjustment method, comprising: measuring a quantity of light emission from each of a plurality of light emitting devices in a light emitting device array in which a plurality of the light emitting devices are arranged in a primary scanning direction to form a device row and a plurality of the device rows are arranged in a secondary scanning direction; computing an adjustment quantity required for adjusting the quantity of the light emission based on an image density calculated from the measured quantity of the light emission and sensitivity characteristics of a photosensitive material to be exposed so that the calculated image density of each of the light emitting devices in a device row becomes substantially equal to each other; and adjusting the quantity of the light emission based on the computed adjustment quantity.

According to a fourth aspect of the present invention, there is provided an exposure apparatus, comprising: a light emitting device array in which a plurality of light emitting devices are arranged in a primary scanning direction to form a device row, and a plurality of the device rows are arranged in a secondary scanning direction; a light quantity measuring device for measuring a quantity of light emission of each of the light emitting devices in the light emitting device array; an adjustment quantity computing section for computing an adjustment quantity required for adjusting the quantity of the light emission based on the image density calculated from the measured quantity of the light emission and sensitivity characteristics of a photosensitive material to be exposed so that the calculated image density of each of the light emitting devices in a device row becomes substantially equal to each other; and a light quantity adjustment section for adjusting the quantity of the light emission based on the computed adjustment quantity.

According to the present invention, the light quantity is adjusted by using the adjustment quantity computed in accordance with the sensitivity characteristics of the photosensitive material in use, so that the quantity of light emission of each light emitting device can be adjusted with a high degree of precision. Further, the image density calculated from the quantity of the light emission measured by the light quantity measuring section and the sensitivity characteristics of the photosensitive material to be exposed is used, so that an expensive and extensive density measuring system is not required.

In the aforementioned light quantity adjustment device, it is preferable that the light quantity measuring section measures the quantity of the light emission from each light emitting device at a higher resolution than a pitch within each row of the light emitting devices. By doing this, the light quantity distribution can be measured with one pixel being divided into plural regions, thus resulting in higher measurement accuracy.

The light quantity measuring section may be configured to measure the quantity of light emission from each light emitting device by sequentially scanning a plurality of light emitting devices arrayed in the primary scanning direction. Further, when the light quantity measuring section performs sequential scanning in the primary scanning direction, in order that the quantity of light emitted from the adjacent light emitting devices is reduced, it is preferred that the plural light emitting devices be sequentially illuminated in synchronization with the sequential scan.

Furthermore, the light quantity measuring section may be configured to illuminate part of or all of the plural light emitting devices arrayed in the primary scanning direction at the same time, and to measure the light quantities of the illuminated light emitting devices at the same time. In the case where the quantity of light emitted from the plural light emitting devices is measured at the same time, the configuration of the device can be simplified. In this case, in order to reduce the light quantity from the adjacent light emitting devices, it is preferred that interval illumination be performed, that is, only light emitting devices at a predetermined spacing interval being illuminated at any one time.

In the aforementioned light quantity adjustment device, the adjustment quantity computing section preferably computes the adjustment quantity to make the image density of each light emitting device in a device row substantially equal to a calculated minimum image density of the light emitting devices in that device row.

The light quantity adjustment method according to the present invention comprises measuring a quantity of light emission from each light emitting device in a light emitting device array in which plural light emitting devices are arranged in a primary scanning direction to form a device row and plural device rows are arranged in a secondary scanning direction; computing the adjustment quantity required for adjusting the quantity of light emission, based on an image density calculated from the measured quantity of the light emission and the sensitivity characteristics of a photosensitive material to be exposed in order to make the calculated image density of each light emitting device in a device row substantially equal to each other; and adjusting the quantity of the light emission based on the computed adjustment quantity.

With the exposure apparatus according to the present invention, a light quantity is adjusted by using an adjustment quantity computed in accordance with the sensitivity characteristics of a photosensitive material to be exposed so that the quantity of light emission from each light emitting device can be adjusted with high accuracy, as is the case with the aforementioned light quantity adjustment device. Thus, when the photosensitive material is exposed to light, a uniform exposure density can be achieved, thereby preventing occurrence of unevenness of exposure. Further, since the calculated image density is calculated from the quantity of light emission measured by the light quantity measuring section and the sensitivity characteristics of the photosensitive material to be exposed, no expensive and extensive density measuring system is required.

According to the present invention, the quantity of light emission of each light emitting device of an exposure light source including plural light emitting devices can be adjusted with high accuracy, without using an expensive image density measuring system, thereby preventing occurrence of unevenness of exposure when the photosensitive material is exposed to light.

DETAILED DESCRIPTION OF PREFERRED EMBODIMENTS

Figure 1:
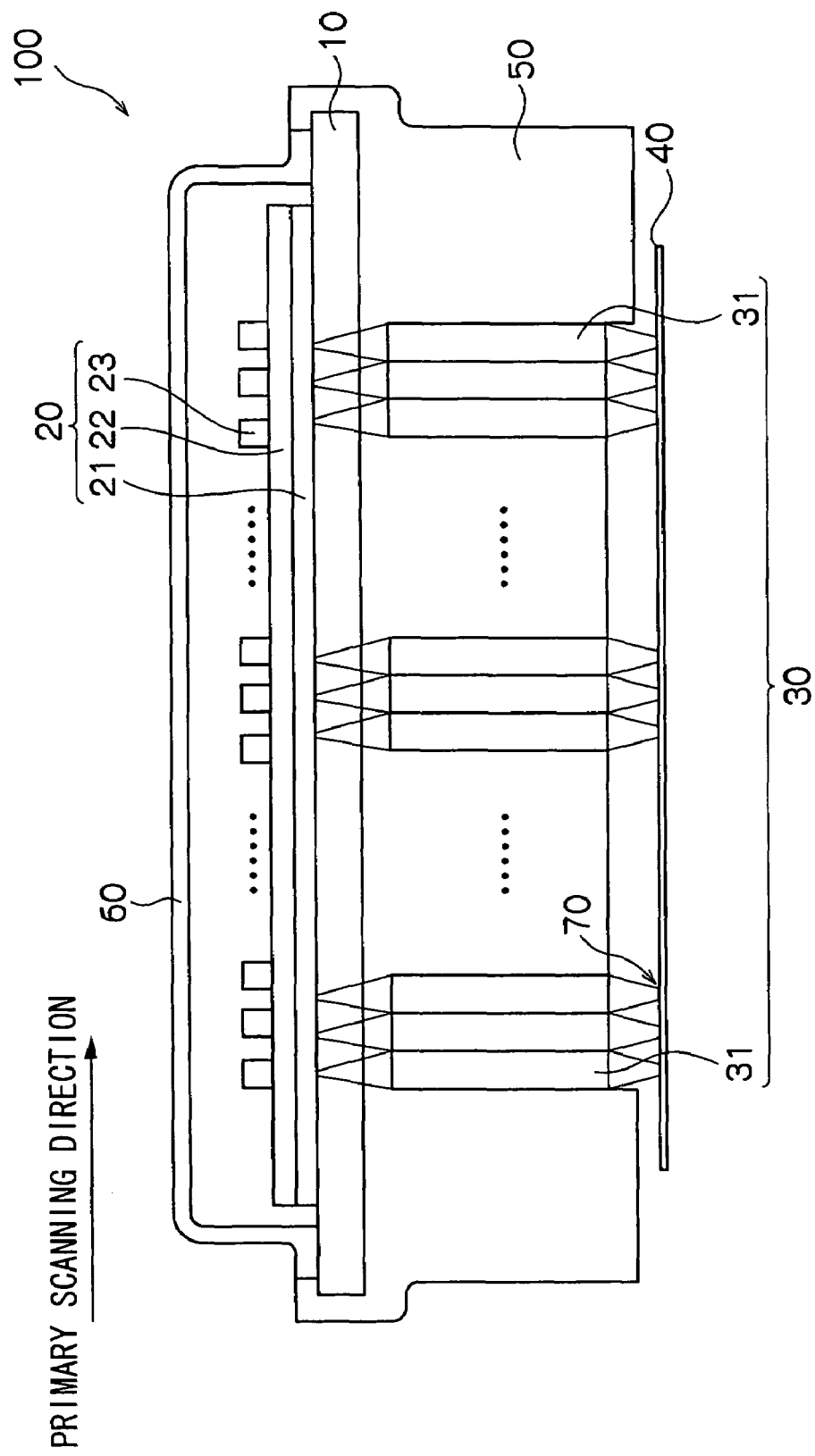
FIG. 1 is a cross-sectional view showing an exposure apparatus according to an embodiment of the present invention.

With reference to the drawings, embodiments of the present invention will be explained in detail below. As shown in FIG. 1, an exposure apparatus according to the present invention is provided with an exposure head 100 including a transparent substrate 10, an organic electroluminescence device 20 formed onto the transparent substrate 10 by vapor deposition, a SELFOC lens array (referred to as "SLA" hereinafter) 30 for focusing light emitted from the organic electroluminescence device 20 to irradiate the focused light onto a photosensitive material 40, and a supporting body 50 for supporting the transparent substrate 10 and the SLA 30.

The organic electroluminescence device 20 is formed by laminating a transparent anode 21, an organic compound layer 22 including a light emitting layer, and metal cathodes 23 in the named order onto the transparent substrate 10. A desired color of light emission can be obtained by selecting a material of the organic compound layer 22, including the light emitting layer, accordingly. On the transparent substrate 10 are formed a light emitting section 20R emitting red (R) light, a light emitting section 20G emitting green (G) light, and a light emitting section 20B emitting blue (B) light with a predetermined pattern which will be described hereinafter. In the case of the organic electroluminescence device, each light emitting section corresponds to a "light emitting device" according to the present invention.

The organic electroluminescence device 20 is, for example, covered by a sealing member 60 such as a stainless steel can or the like as shown in FIG. 1. Edges of the sealing member 60 and the transparent substrate 10 are adhered to each other, and the organic electroluminescence device 20 is sealed inside the sealing material 60 filled with dry nitrogen gas. When a predetermined voltage is applied between the transparent anode 21 and the metal cathodes 23 in the organic electroluminescence device 20, the light emitting layer incorporated in the organic compound layer 22 emits light, and the light emission is emitted through the transparent anode 21 and the transparent substrate 10. The organic electroluminescence device 20 features excellent wavelength stability.

The transparent substrate 10 is a substrate transparent to the emission lights, and a glass substrate, plastic substrate and the like can be used as the transparent substrate 10. Heat resistance, dimensional stability, solvent resistance, electric insulation, workability, low gas permeability, and low hygroscopicity are general substrate properties required of the transparent substrate 10.

Preferably, the transparent anode 21 has a light permeability at least equal to or higher than 50%, preferably equal to or higher than 70% in the visible light wavelength range of 400 nm–700 nm. To form the transparent anode 21, a thin film may be used, which as a material is formed from compounds known as transparent electrode materials such as tin oxide, indium tin oxide, and indium zinc oxide, or metals with a high work function such as gold and platinum. Organic compounds such as polyaniline, polythiophene, polypyrrole, or derivatives of the same, may also be used. Details of transparent conductive films are described by Yutaka Sawada, NEW DEVELOPMENT IN TRANSPARENT CONDUCTIVE FILMS, CMC Publishing Co., Ltd. (1999), and can be applied to the present invention. The transparent anode 21 may be formed onto the transparent substrate 10 by a vacuum deposition method, sputtering method, or ion plating method.

The organic compound layer 22 may have either a single layer configuration comprising the light emitting layer alone or a multiple layer configuration comprising other appropriate layers in addition to the light emitting layer, such as a hole injection layer, a hole transport layer, an electron injection layer, and/or an electron transport layer. A specific configuration of the organic compound layer 22 (including electrodes) may be one of the following: anode/hole injection layer/hole transport layer/light emitting layer/electron transport layer/cathode; anode/light emitting layer/electron transport layer/cathode; or anode/hole transport layer/light emitting layer/electron transport layer/cathode. It is also possible that more than one light emitting layer, hole transport layer, hole injection layer, and/or electron injection layer may be provided.

Each layer in the organic compound layer 22 can be formed by sequentially forming and laminating thin films by vapor deposition of low molecular weight organic materials, beginning with the layer at the transparent anode 21 side. In this event, use of a deposition mask makes the forming of patterning simple to achieve.

The metal cathodes 23 are preferably formed of a metallic material such as, for example: an alkali metal such as Li or K with a low work function; an alkaline-earth metal such as Mg or Ca; or an alloy or a mixture of one or more of these metals with Ag or Al. In order to maintain both storage stability and electron injection properties in the cathode, the electrode formed of the aforementioned material may be further coated with Ag, Al, or Au having high work function and high conductivity. The metal cathodes 23, may be formed, like the transparent anode 21, by a known method such as a vacuum deposition method, a sputtering method, or an ion plating method.

The SLA 30 comprises plural SELFOC lenses 31. Each SELFOC lens 31 is a rod-like, thick lens having a refractive index profile in the radial direction as viewed in a cross section thereof. Light incident on the SELFOC lens 31 proceeds, meandering in the form of a sine wave, along the optical axis of the lens towards the photosensitive material 40, and then forms an image of exposure spot 70 at the surface of the photosensitive material 40.

In order to focus the exposure spot and suppress optical crosstalk, apertures of the SELFOC lens 31 are formed to be larger than the light emitting area of each light emitting section in the organic electroluminescence device 20. Further, adjacent SELFOC lenses 31 are disposed in an array such that they are in contact with each other. The SELFOC lenses 31 may be disposed in one-to-one correspondence to the light emitting section. Alternatively, each SELFOC lens 31 may be disposed so as to correspond to plural light emitting sections with one or two lenses 31 disposed so as to correspond to sets of the light emitting sections 20R, 20G and 20B arrayed in the secondary scanning direction.

Figure 2:
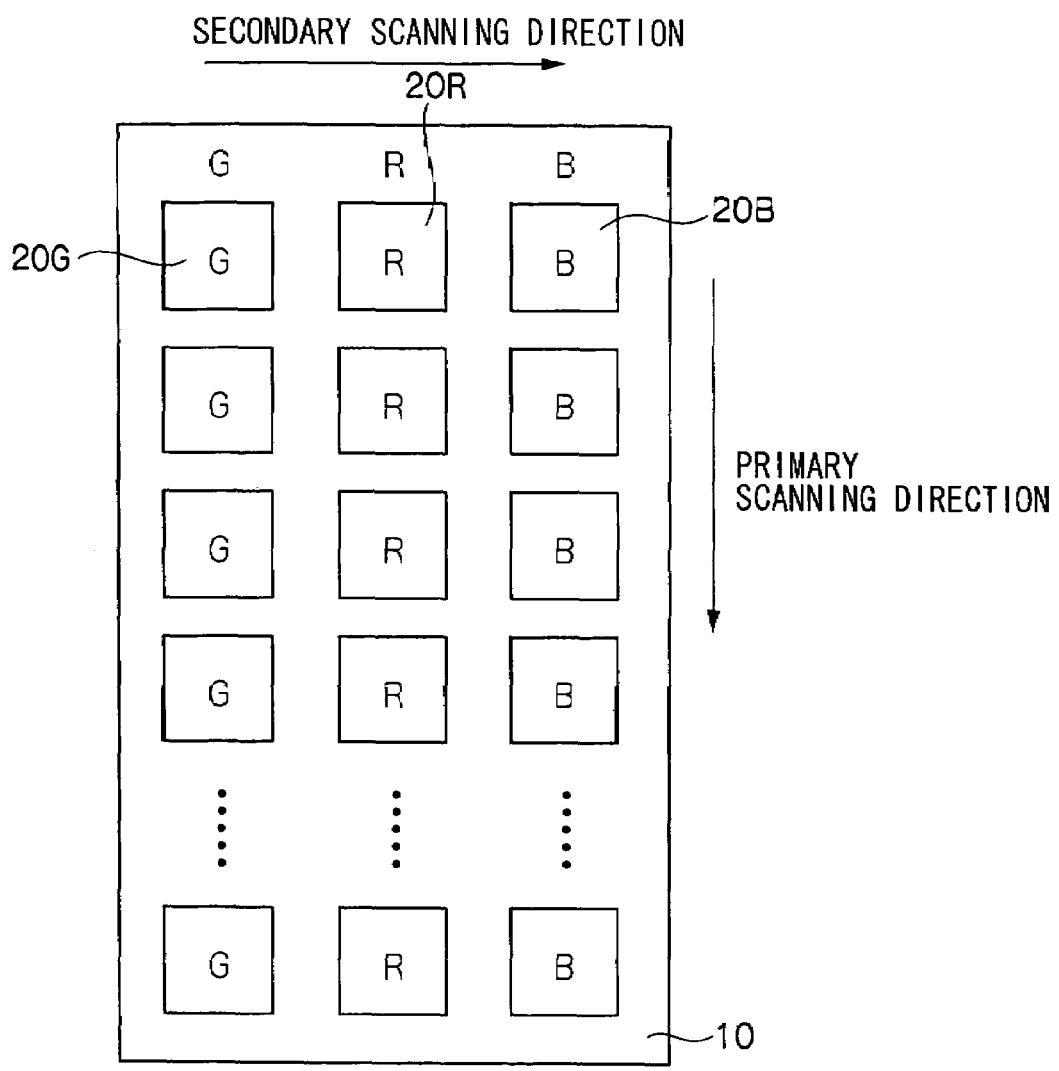
FIG. 2 is a plan view showing a pattern for forming light emitting sections in an organic electroluminescence device.

Description will now be made of an arrangement of each of the light emitting sections in the organic electroluminescence device 20. The light emitting sections 20R, 20G, and 20B are formed onto the transparent substrate 10 as shown in FIG. 2. More specifically, the plural light emitting sections 20R are arranged in the primary scanning direction at a given interval, the pitch of the light emitting sections, to form a light emitting section row R, and arranged so that there is one such row in the secondary scanning direction. Similarly, the plural light emitting sections 20G are arranged in the primary scanning direction at a given interval to form a light emitting section row G, and arranged so that there is one such row in the secondary scanning direction. Further, the plural light emitting sections 20B are arranged in the primary scanning direction at given intervals to form a light emitting section array B, and arranged so that there is one such row in the secondary scanning direction. Furthermore, a possible arrangement has plural emitting section rows for each color. Since generally an organic electroluminescence device for red color R has a lower light emission intensity, it is preferred that a larger number of the light emitting section rows R be provided.

Figure 3:
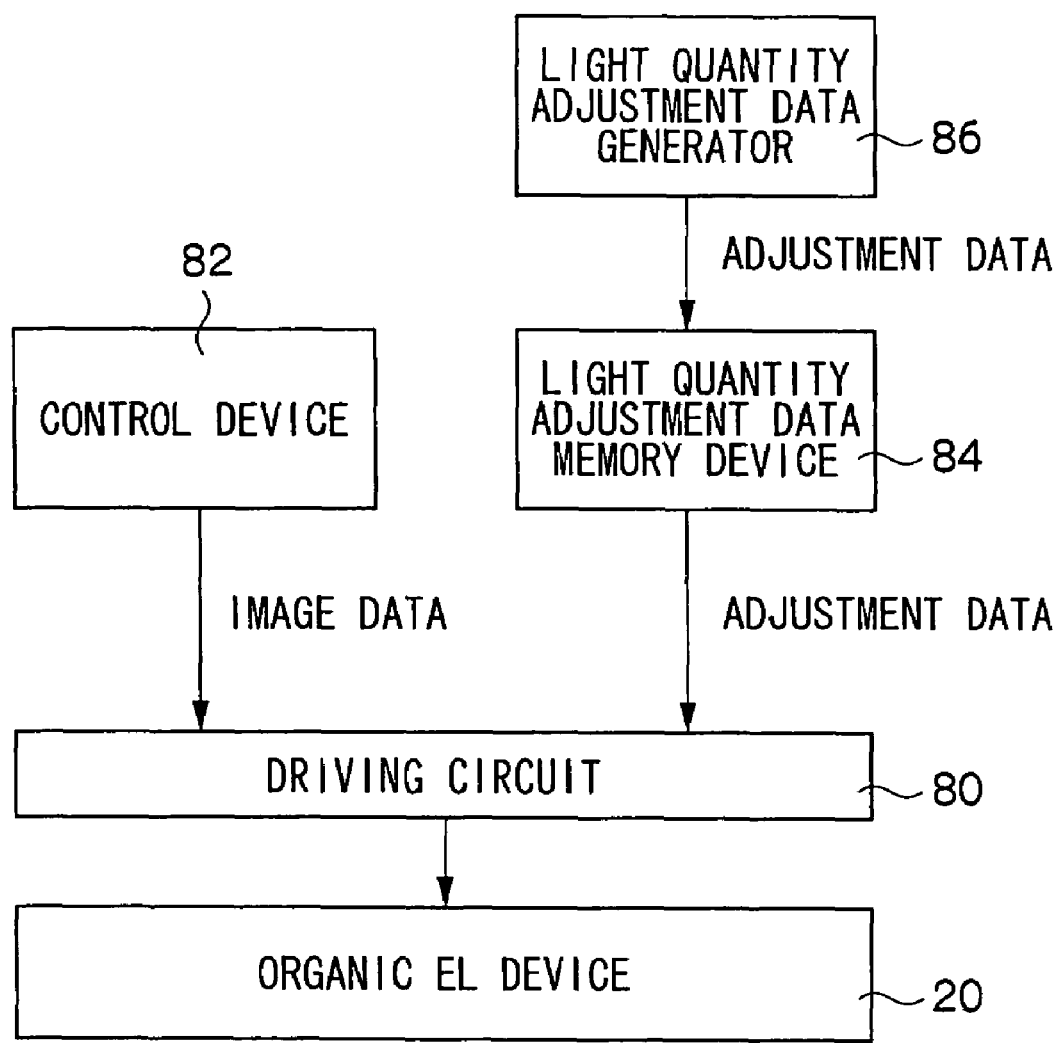
FIG. 3 is a block diagram showing a configuration for implementing light quantity adjustment.

Next, a driving circuit and the like for the organic electroluminescence device 20 will be described. As shown in FIG. 3, the exposure apparatus according to an embodiment of the present invention comprises: a driving circuit 80 in a light quantity adjustment section, for independently driving (passive driving) each of the plural light emitting sections in the organic electroluminescence device 20; a control device 82 for controlling the operation of the driving circuit 80; and a light quantity adjustment data memory device 84 for storing adjustment data to adjust the light quantity of each light emitting section in the organic electroluminescence device 20. Both the transparent anode 21 and the metal cathodes 23 in the organic electroluminescence device 20 are connected to the driving circuit 80, which is in turn connected to the control device 82 and the light quantity adjustment data memory device 84.

The driving circuit 80 comprises a power supply unit (not shown), for applying voltage between both of the electrodes and a switching device (not shown), formed by transistors or thyristors. The driving circuit 80 generates driving signals based on image data entered from the control device 82 thereby driving each of the plural light emitting sections.

A light quantity adjustment data generator 86, as described later, measures the light intensity distribution (hereinafter also referred to as "light quantity distribution") on the exposed surface of an exposure head 100, generates adjustment data based on light intensity distribution and is connected to the light quantity adjustment data memory device 84. The light quantity adjustment data memory device 84 stores in advance the adjustment data input from the light quantity adjustment data generator 86, and supplies the driving circuit 80 with the adjustment data at predetermined timings such as when image data is input or the like.

The light quantity adjustment data generator 86 may be incorporated in the exposure apparatus, or may be configured separate from the exposure apparatus and connected thereto. When incorporated in the exposure apparatus, the light quantity adjustment data generator 86 is provided preferably in such a manner that it can be inserted in the measuring position when the light quantity is measured, and can also be removed therefrom when exposure is effected.

With the exposure apparatus configured as described above, the image data is inputted from the control device 82, and the adjustment data is input from the light quantity adjustment data memory device 84 to the driving circuit 80. The driving circuit 80 generates a driving signal based on the input image data, adjusts the image data based on the adjustment data, and drives each of the light emitting sections (20R, 20G, 20B) in the organic electroluminescence device 20. This enables each light emitting section to emit the adjusted quantity of light. Then, the light emitted from each light emitting section: is collected by the SLA 30; the corresponding position on the photosensitive material 40 is exposed; and the exposure spot 70 is formed. Displacement of the exposure apparatus relative to the photosensitive material 40 in the secondary scanning direction results in the photosensitive material 40 being scan-exposed.

Figure 4:
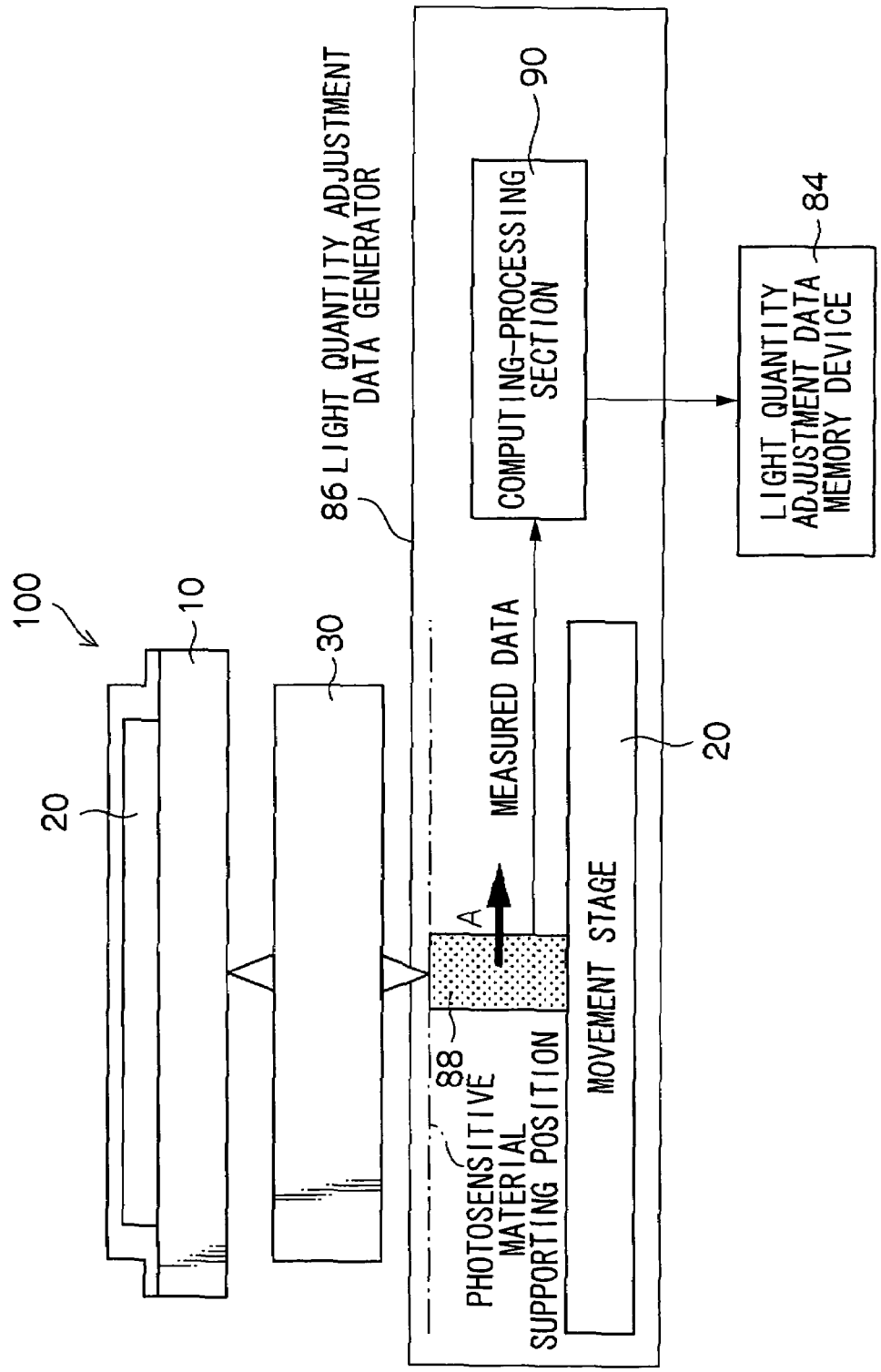
FIG. 4 is a block diagram showing a configuration of a light quantity adjustment data generator.

As shown in FIG. 4, the light quantity adjustment data generator 86 includes a light quantity measuring section including a sensor 88 for measuring the light intensity distribution of the exposure head 100, and an adjustment quantity computing-processing section 90 for computing the light quantity adjustment data based on the measured data input from the sensor 88. The adjustment quantity computing-processing section 90 is connected to the light quantity adjustment data memory device 84. The sensor 88 is disposed so as to be movable on a movement stage 91 in the direction shown by an arrow A (in the primary scanning direction of the exposure head). The exposure head 100 is supported in a predetermined position by a supporting member (not shown). The sensor 88 is disposed so that a light receiving surface of the sensor 88 faces the light emitting surface of the exposure head 100 and is positioned in the imaging plane of the SLA 30 (a position where the photosensitive material is to be located).

Figure 5A:
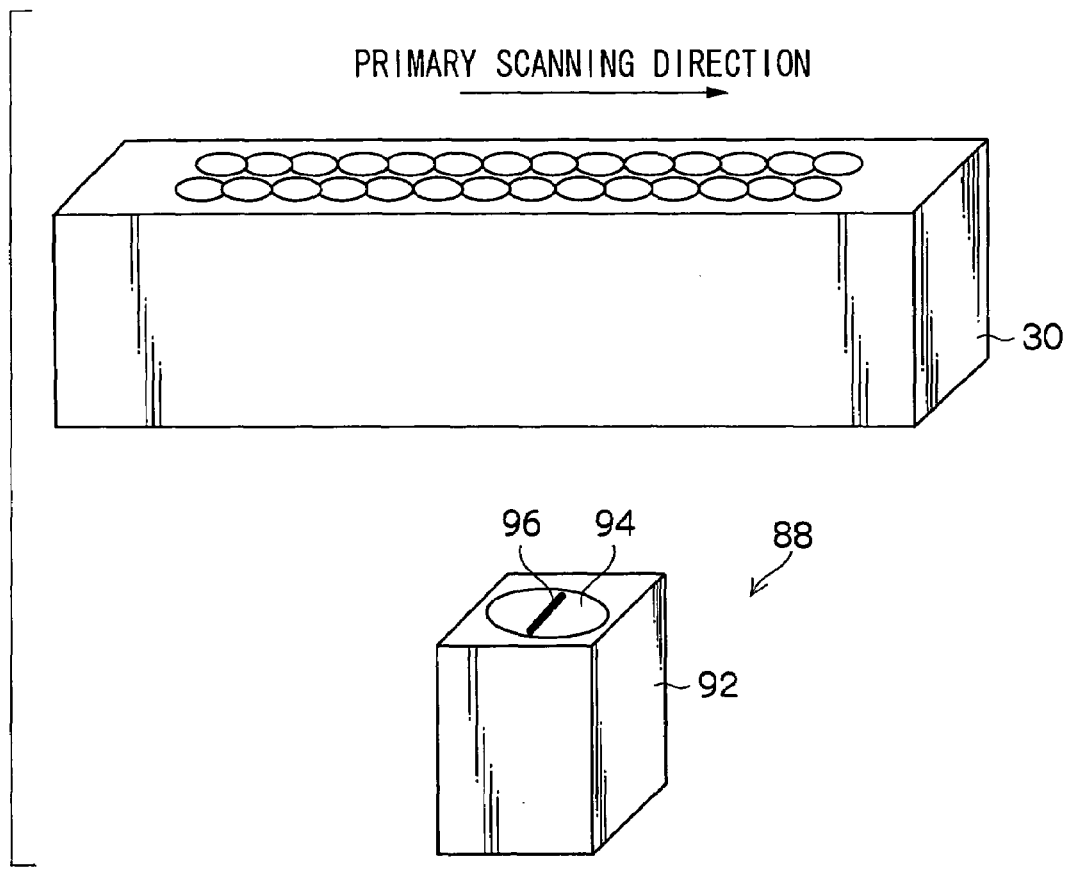
FIGS. 5A and 5B are perspective views showing configurations of a light quantity measuring section in an exposure head to measure a light emission intensity distribution.

The sensor 88, as shown in FIG. 5A, includes a photo detector 92 and a light shielding member 94 mounted on the light receiving surface thereof. It is preferable to use a high-sensitivity photo detector such as a photoelectric multiplier tube, as the photo detector 92. The light shielding member 94 is formed with a slit 96 extending in the direction orthogonal to the primary scanning direction (the direction in which the lenses of the SLA 30 are arranged as viewed in FIG. 5A) of the exposure head 100. The slit 96 is configured to be narrower in width than the pitch of the light emitting sections.

Figure 6:
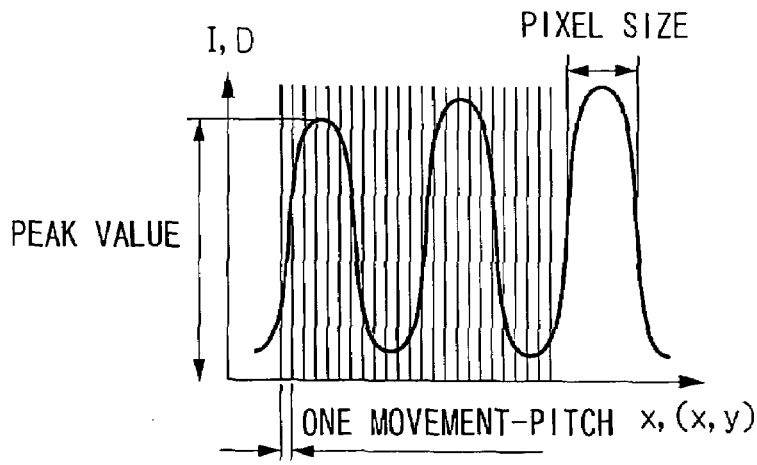
FIG. 6 is a graph showing the light emission intensity distribution (light quantity distribution) in the exposure head.

Although each light emitting section is disposed in correspondence to each exposure spot (exposure pixel) because of the width of the slit 96 being made narrower than the pitch of the light emitting section, it is possible to measure the light intensity distribution with each one pixel being divided into plural regions as shown in FIG. 6. Consequently, despite variances in shape between the light emitting devices (between the light emitting sections thereof), disparities in refractive indices of the lenses, and misalignment of the lenses, the light intensity distribution can be precisely measured.

With the light quantity adjustment data generator 86 configured as described above, the sensor 88: detects the light entering the light-receiving surface thereof, while moving on the movement stage 91, in the direction of the arrow A, at a constant velocity; generates an electrical signal, corresponding to the quantity of the received light, by using photo-electric conversion; and outputs the electrical signal, to the adjustment quantity computing-processing section 90, as the measured data. The adjustment quantity computing-processing section 90 then, based on the measured data, computes the adjustment data to adjust the light quantity of each light emitting section in the organic electroluminescence device 20, and outputs the computed adjustment data to the light quantity adjustment data memory device 84.

When scanning is performed by using the sensor 88 as shown above, synchronous lighting is preferable so that each light emitting section in the organic electroluminescence device 20 is lit in synchronization with the movement of the sensor 88. By carrying out measurement with each of the light emitting sections being lit only when it is determined that the sensor 88 has reached the corresponding measurement range, it is possible to avoid the influence of the light emitted from the adjacent light emitting sections, thereby improving the measurement accuracy.

Figure 5B:
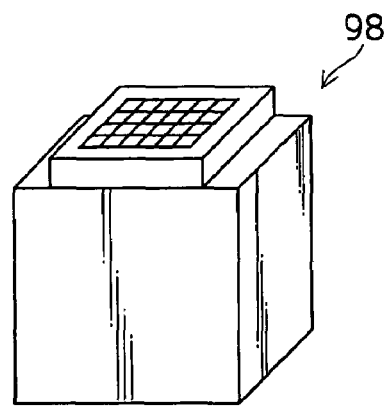

It is also possible to measure a two-dimensional distribution of the light intensity by providing a pin hole in the light-receiving surface instead of the slit and moving the sensor 88 in directions in two-dimensions. A charge-coupled device (CCD) 98 shown in FIG. 5B may also be provided instead of the sensor 88 in the light quantity measuring section. The CCD 98 is disposed so that the light receiving surface thereof corresponds to the imaging plane of the SLA 30. The CCD 98 measures the light quantity after having moved a distance shorter than the width of the CCD 98 as viewed in the direction of the arrow A in FIG. 4, and repeats the movement and the measurement to measure the light quantity distribution of the entire exposure head 100. In this case, it is preferable that the movement-pitch of the CCD 98 is small. If there is large overlap in the light quantity distribution measurement range, then multiple measurements can be effected of a single position. This suppresses occurrence of unevenness in shading of the CCD 98 and thus minimizes measurement errors.

Figure 7:
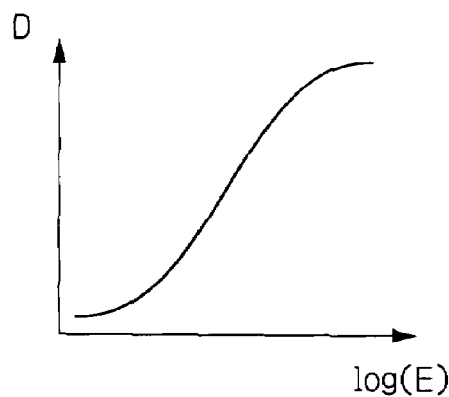
FIG. 7 is a graph showing the sensitivity characteristics of a photosensitive material.

The method for computing the adjustment data will now be described below. FIG. 7 shows the sensitivity characteristic of the photosensitive material 40 used in the embodiment of the present invention. The term "sensitivity characteristics" is used herein to mean the dependency between image density and exposure energy. The photosensitive material shown in FIG. 7 is a silver halide photosensitive material (referred to as "color paper"), which exhibits sensitivity characteristics such that the image density increases linearly with a logarithm of exposure energy (log(E)), though the build-up response is low and a saturation density is reached at a certain exposure energy level. Hence, a density distribution shown in FIG. 8 can be obtained by combining the light quantity distribution shown in FIG. 6 with the sensitivity characteristic shown in FIG. 7.

Figure 8:
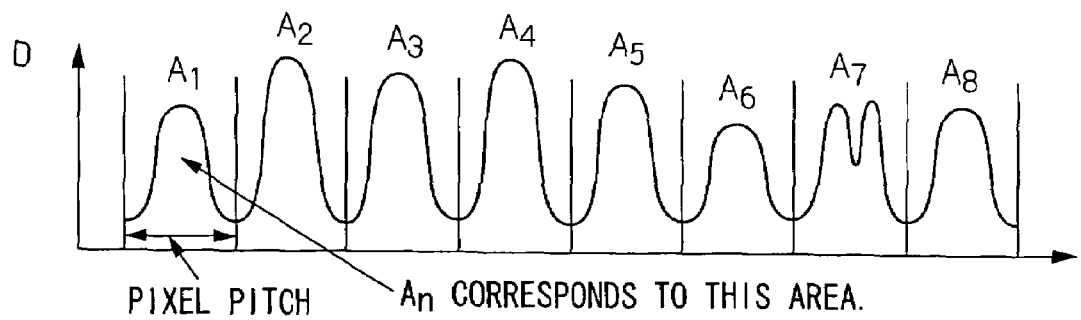
FIG. 8 is a graph showing a density distribution of each pixel obtained by computation.

In the case where n light emitting sections are provided with respect to n exposure pixels, a density An of the nth pixel can be obtained by performing the calculation according to the following equation (1) by using the measured values of the light quantity distribution. In FIG. 8, the density An of the pixel corresponds to an area under each peak.

$$A_n = \int D_n(x)dx = \int f(E_n)dx = \int f(P_n(x) \cdot t_n)dx \quad (1)$$

In the equation (1), $D_n(x)$ indicates the density distribution of the nth pixel; $E_n(x)$ the distribution of exposure quantity of the nth pixel; $P_n(x)$ the light quantity distribution of the nth pixel; and $t_n$ the exposure time of the nth pixel. The sensitivity characteristics of the photosensitive material is represented by the following equation:

$$D = f(E)$$

Although in the above-mentioned equation (1), the density An of the nth pixel is obtained by integrating the density distribution $D_n(x)$ of the nth pixel, it is also possible to obtain the density of An by summation of the products of the measurement-pitch $\Delta x$ and the density $D(x)$ of each division of the divided region, as shown by the equation given below. The term "measurement-pitch" refers to the measurement cycle (slit width) in the aforementioned slit scan or the movement pitch of the CCD.

$$An = \Sigma D(x) \Delta x$$

As shown by the following equation (2), the density of the pixel which assumes the minimum density value among the image densities $A1$–$A_n$ is referred to as the minimum density $A_{min}$.

$$A_{min} = \min(A_1, A_2, \ldots, A_{n-1}, A_n) \quad \text{Equation (2)}$$

For example, consideration is made of the case where the light quantity of each light emitting section is adjusted so that the density of n pixels corresponds to the minimum density $A_{min}$. Assuming that the adjustment coefficient for the light quantity of the nth light emitting section is a $\alpha_n$, the following equation (3) holds:

$$A_{min} = \int f(\alpha_n \cdot P_n(x) \cdot t_n)dx \quad \text{Equation (3)}$$

The adjustment coefficient $\alpha_n$ is computed from the above equation (3), and adjustment data to adjust either a driving voltage or a driving current to be supplied is computed based on the computed adjustment coefficient an $\alpha_n$ that the light quantity of the nth light emitting section becomes $\alpha_n P_n$.

Also the light emitting time (exposure time) of each light emitting section may be adjusted so that the density of the nth pixel corresponds to the minimum density $A_{min}$. Assuming that the adjustment coefficient for the exposure time of the nth light emitting section is $\beta_n$, the following equation (4) holds:

$$A_{min} = \int f(P_n(x) \cdot \beta_n \cdot t_n)dx \quad \text{Equation (4)}$$

The adjustment coefficient $\beta_n$ is computed from the above equation (4), and adjustment data used to adjust either a driving pulse width or a driving pulse number is computed based on the adjustment coefficient $\beta_n$ so that the exposure time of the nth light emitting section becomes $\beta_n t_n$.

As will be appreciated from the above discussion, with the exposure apparatus according to the embodiment, the light quantity of each light emitting section in the organic electroluminescence device is adjusted by using the adjustment data computed in accordance with the sensitivity characteristic of the sensitive material in use, so that the light quantity adjustment can be effected with a high degree of accuracy. Further, since the light quantity of each light emitting section is adjusted by using the adjustment data computed so that the densities of the respective pixels become equal to each other, the exposure density becomes uniform so that unevenness of exposure can be prevented.

Especially, according to this embodiment of the present invention, since the density distribution is estimated from the light quantity distribution of the exposure head and the sensitivity characteristics of the photosensitive material, and since the adjustment data is computed based on the estimated density distribution, no expensive and extensive density-measuring system is required. Consequently, the cost can be reduced and the system can be made more compact.

Further, according to this embodiment of the present invention, the light quantity distribution of the exposure head can be measured with a high degree of accuracy, since a slit narrower than the pitch of the light emitting sections is formed in the light receiving surface of the sensor and the light quantity distribution is measured with each one pixel being divided into plural regions.

According to a second embodiment of the present invention, the exposure apparatus has the same configuration as the exposure apparatus according to the first embodiment except that the light intensity distribution of the light quantity adjustment data generator is measured by a line CCD in the light quantity measuring section. Therefore, the identical components are denoted by the identical reference numbers, and further description thereof will be omitted.

Figure 9:
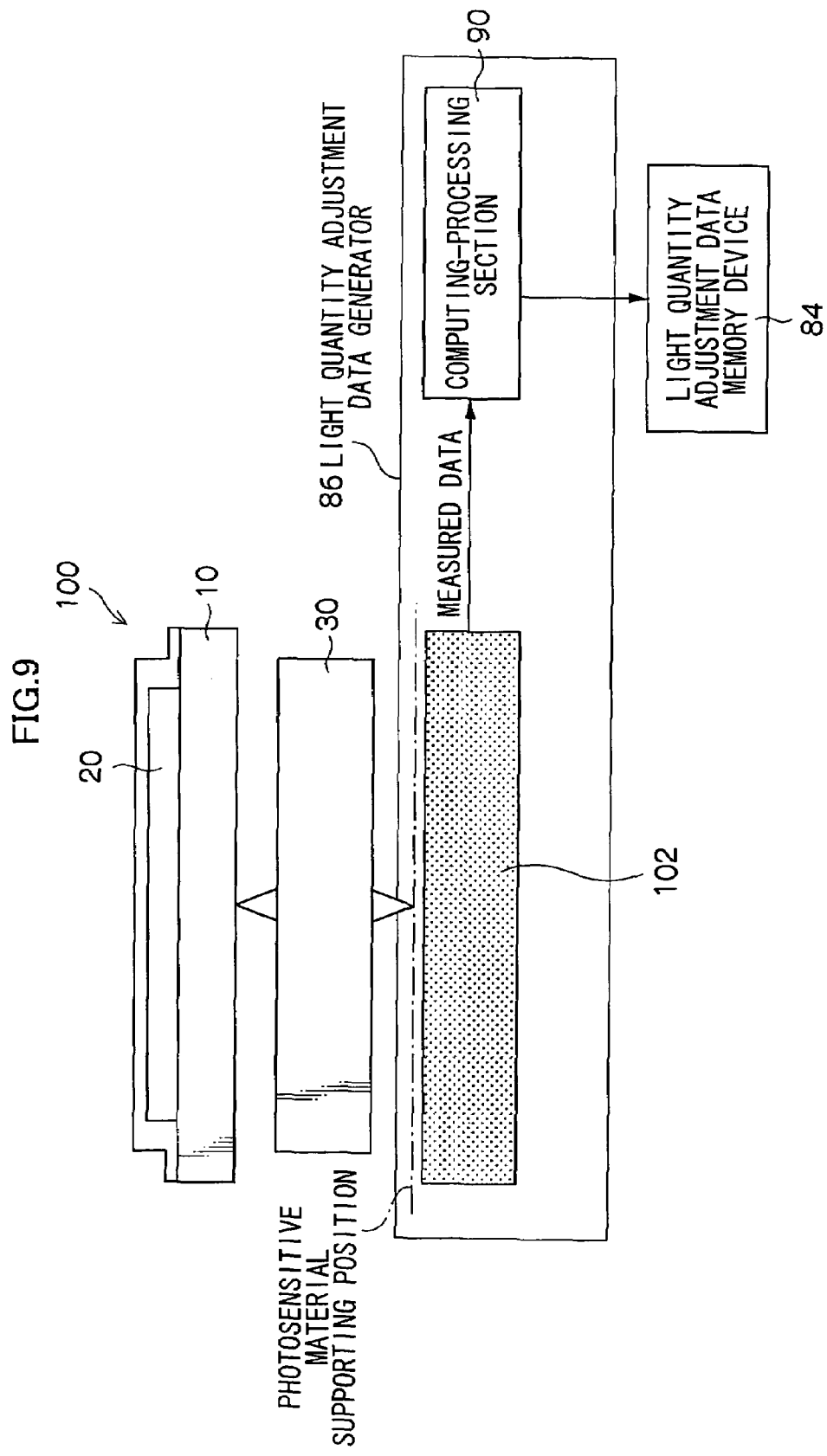
FIG. 9 is a block diagram showing other configuration of the light quantity adjustment data generator.

As shown in FIG. 9, a light quantity adjustment data generator 86 includes a line CCD 102 to measure the light intensity distribution of an exposure head 100, and an adjustment quantity computing-processing section 90 to compute the light quantity adjustment data based on a measurement data input from the line CCD 102. The exposure head 100 is supported in a predetermined position by a supporting member (not shown). The line CCD 102 is equipped with a light receiving surface capable of measuring the entire light emitting surface of the exposure head 100, and the light receiving surface is disposed in an opposing relationship with the light emitting surface of the exposure head 100 and positioned at the imaging plane of the SLA 30. Further, in the line CCD 102, a number of light receiving devices are arranged along the primary scanning direction of the exposure head 100, and the light receiving devices are arrayed at a narrower pitch than the pitch of the light emitting sections within the device rows.

With the light quantity adjustment data generator 86 configured as described above, the line CCD 102 detects light incident on the light receiving surface thereof, and outputs measurement data to the adjustment quantity computing-processing section 90. The adjustment quantity computing-processing section 90 then computes the adjustment data based on the measurement data, and outputs the computed adjustment data to a light quantity adjustment data memory device 84. The adjustment data is calculated in the same way as in the first embodiment.

Figure 10:
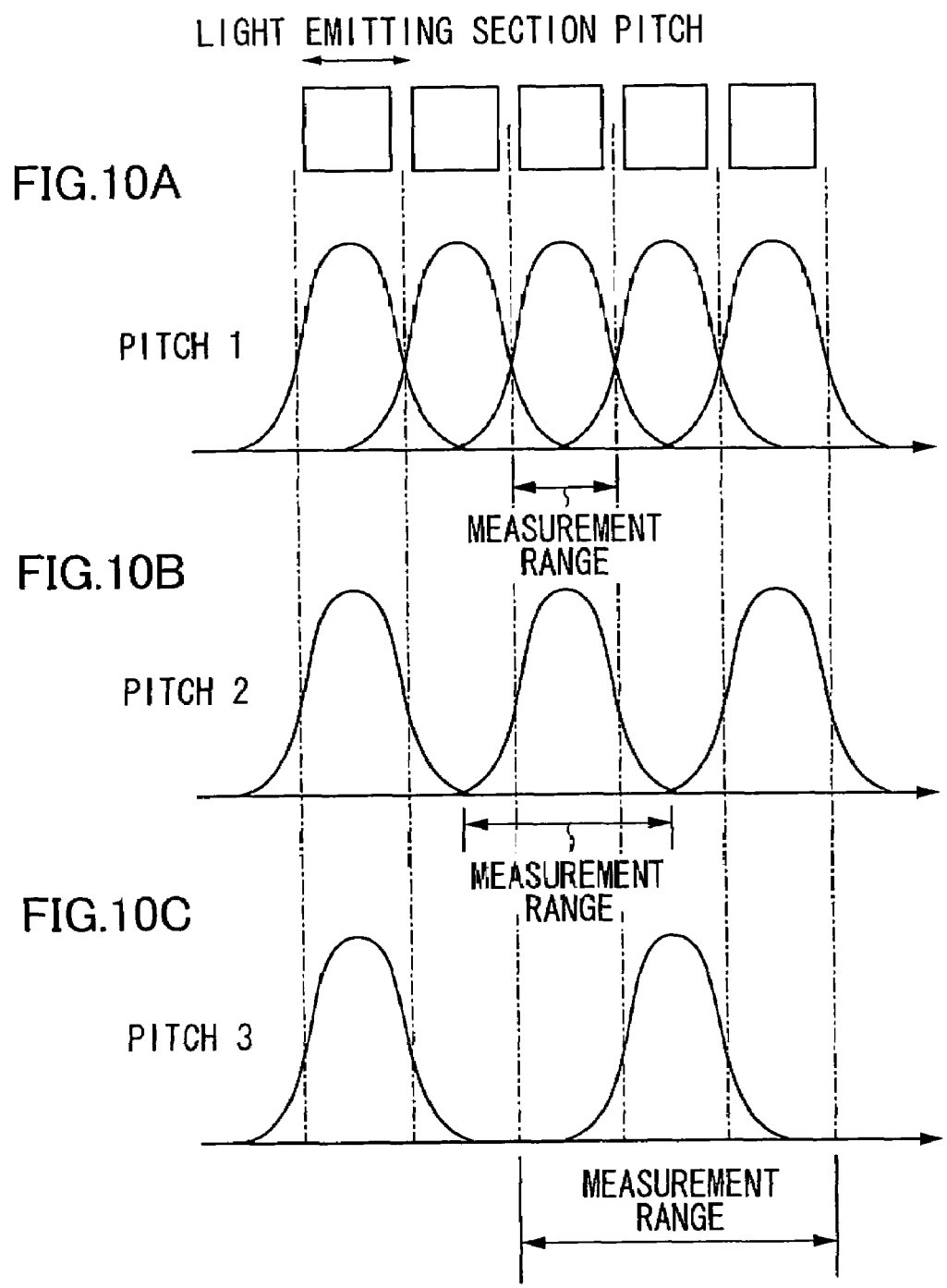
FIG. 10A is a conceptual diagram showing an optical profile with whole row illumination.
FIGS. 10B and 10C are a conceptual diagram showing optical profiles with illumination at various intervals.
Figure 11:
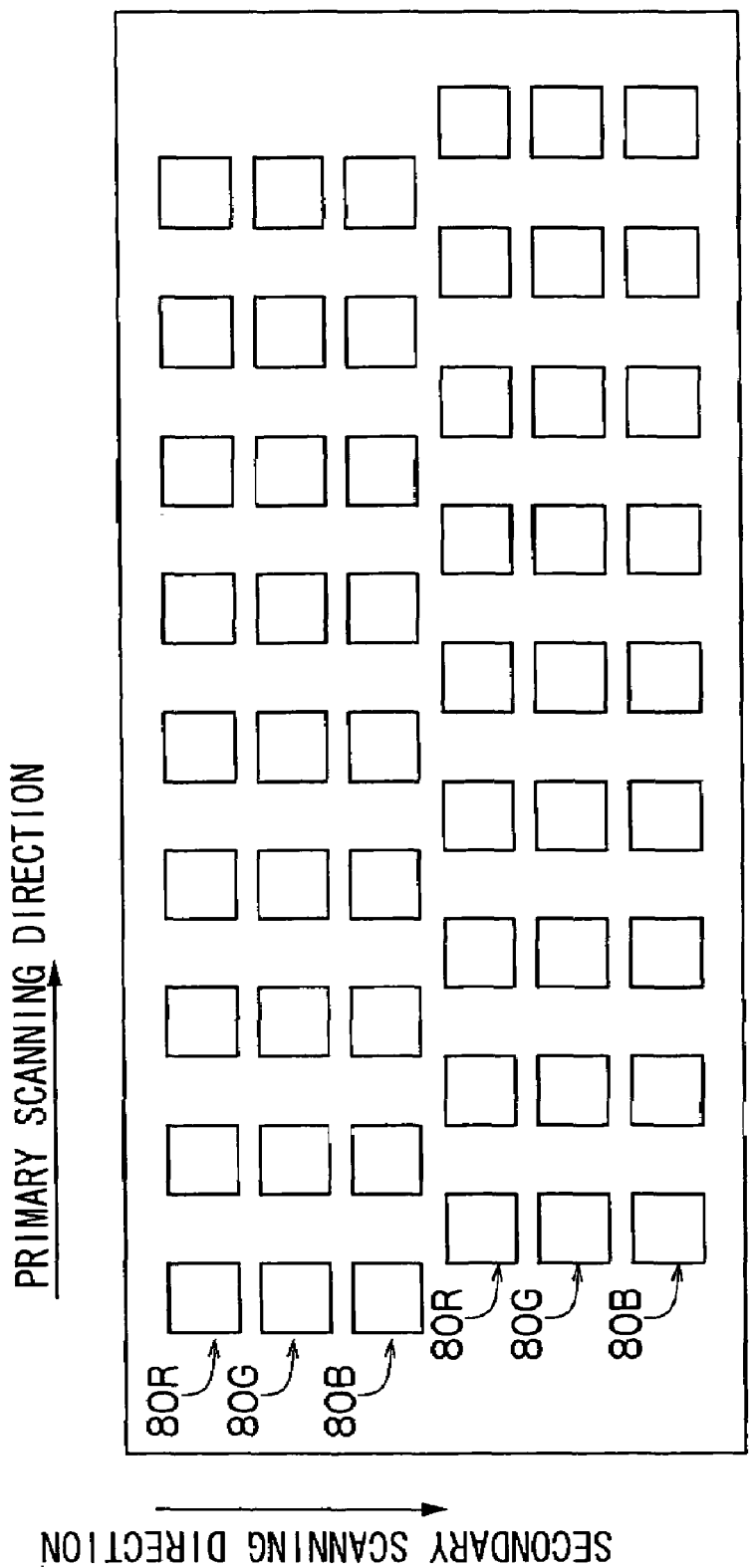
FIG. 11 is a plan view illustrating an arrangement of organic electroluminescence devices formed onto a transparent substrate in a conventional exposure apparatus.

In the case where the light intensity distribution of the exposure head 100 is measured by the line CCD 102, if whole row illumination of all the light emitting sections of a row in the organic electroluminescence device is performed at one time, the profiles of the respective light emitting sections cannot be separated as shown in FIG. 10A, and light from adjacent light emitting sections is detected so that the light quantity cannot be measured accurately for each light emitting section. Hence, as shown in FIGS. 10B and 10C, it is preferred that interval illumination be performed at intervals of every other m light emitting sections (m is an integer equal to or greater than unity). In the case of the interval illumination, in order to measure the light quantities of all the light emitting sections, measurement is made plural times by shifting the phase. In this case, the measurement can be made in a range m times longer than the pitch of the light emitting sections, where the minimum value for m is limited such that range skirt of the profile of each light emitting section is sufficiently small. Measurement data from the section of the measurement range which corresponds to the light emitting section's pitch range is used to adjust the light quantity of the corresponding light emitting section.

As will be appreciated from the above discussion, with the exposure apparatus according to the second embodiment of the present invention, the light quantity of each light emitting section in the organic electroluminescence device is adjusted by using adjustment data computed in accordance with the sensitivity characteristics of the photosensitive material to be used without resorting to an expensive and extensive density-measuring system, and thus the light quantity adjustment can be made at low cost and with high precision. Further, since the light quantity of each light emitting section is adjusted by using the adjustment data computed so that each pixel has an equal density, the exposure density can be made uniform, thereby suppressing occurrence of unevenness of exposure.

Further, according to the second embodiment of the present invention, the line CCD equipped with the light receiving surface capable of measuring the entire light emitting surface of the exposure head is used to measure the light quantity distribution of the exposure head. Therefore, there is no need to move the line CCD and as a result the configuration of the system can be simplified. Still further, since the line CCD uses a narrower pitch than the pitch of the light emitting sections, the light quantity distribution can be measured with each one pixel being divided into plural regions, thereby making it possible to measure the light quantity distribution with high precision.

Although in the aforementioned embodiments, description has been made of examples using an organic electroluminescence device comprising a number of light emitting sections arranged in arrays, the present invention is by no means limited to the use of such light emitting device arrays. The present invention can be equally applied, for example, to perform light quantity adjustment of inorganic electroluminescence device arrays, LED arrays, surface light emitting laser arrays, or the like, for example. The present invention can be also applied to perform light quantity adjustment of each pixel in an exposure apparatus by using a spatial light modulating device such as PLZT shutter array, liquid crystal shutter array, or the like.

While the present invention has been illustrated and described with respect to specific embodiments thereof, it is to be understood that the present invention is not limited thereto but encompasses all changes and modifications which will become possible without departing from the scope and spirit of the present invention as defined in the appended claims.

What is claimed is:

1. A light quantity adjustment device, comprising:

a light quantity measuring section for measuring a quantity of light emission from each of a plurality of light emitting devices in a light emitting device array in which a plurality of the light emitting devices are arranged in a primary scanning direction to form a device row and a plurality of the device rows are arranged in a secondary scanning direction;

an adjustment quantity computing section for computing an adjustment quantity required for adjusting the quantity of the light emission based on an image density calculated from the measured quantity of the light emission and sensitivity characteristics of a photosensitive material to be exposed so that the calculated image density of each of the light emitting devices in a device row becomes substantially equal to each other; and a light quantity adjustment section for adjusting the quantity of the light emission based on the computed adjustment quantity.

2. The light quantity adjustment device according to claim 1, wherein:
the light quantity measuring section measures the quantity of the light emission from each of the light emitting devices at a higher resolution than a pitch of the light emitting devices within the device rows.

3. The light quantity adjustment device according to claim 2, wherein:
the light quantity measuring section measures the quantity of light emission from each of the plurality of light emitting devices by sequentially scanning the arranged light emitting devices in the primary scanning direction.

4. The light quantity adjustment device according to claim 3, wherein:
the adjustment quantity computing section computes the adjustment quantity so that the calculated image density of each of the plurality of the light emitting devices in a device row becomes substantially equal to a calculated minimum image density of the light emitting devices of said device row.

5. The light quantity adjustment device according to claim 4, wherein:
n light emitting sections are provided with respect to n exposure pixels, and an adjustment coefficient $\alpha_n$ of an nth light emitting section is computed according to an equation $A_{min} = \int f(\alpha_n \cdot P_n(x) \cdot t_n) dx$, wherein $A_{min}$ is the minimum image density, $P_n(x)$ is a light quantity distribution of an nth pixel, and $t_n$ is an exposure time of the nth pixel, and
a driving voltage or driving current is computed based on the adjustment coefficient $\alpha_n$ so that a light quantity of the nth light emitting section becomes $\alpha_n P_n$.

6. The light quantity adjustment device according to claim 4, wherein:
n light emitting sections are provided with respect to n exposure pixels, and an adjustment coefficient $\beta_n$ of an nth light emitting section is computed according to an equation $A_{min} = \int f(\beta_n \cdot P_n(x) \cdot t_n) dx$, wherein $A_{min}$ is the minimum image density, $P_n(x)$ is a light quantity distribution of an nth pixel, and $t_n$ is an exposure time of the nth pixel, and
a driving voltage or driving current is computed based on the adjustment coefficient $\beta_n$ so that an exposure time of the nth light emitting section becomes $\beta_n t_n$.

7. The light quantity adjustment device according to claim 2, wherein:
when the light quantity measuring section sequentially scans the plurality of light emitting devices in the primary scanning direction, the light emitting devices are sequentially illuminated in synchronization with the scanning.

8. The light quantity adjustment device according to claim 7, wherein:
the adjustment quantity computing section computes the adjustment quantity so that the calculated image density of each of the plurality of the light emitting devices in a device row becomes substantially equal to a calculated minimum image density of the light emitting devices of said device row.

9. The light quantity adjustment device according to claim 2, wherein:
the light quantity measuring section illuminates at one time all or part of the plurality of light emitting devices in a device row and measures the light quantity of the illuminated light emitting devices substantially simultaneously.

10. The light quantity adjustment device according to claim 9, wherein:
the adjustment quantity computing section computes the adjustment quantity so that the calculated image density of each of the light emitting devices in the device row becomes substantially equal to a calculated minimum image density of the light emitting devices of said device row.

11. The light quantity adjustment device according to claim 2, wherein:
the adjustment quantity computing section computes the adjustment quantity so that the calculated image density of each of the plurality of the light emitting devices in a device row becomes substantially equal to a calculated minimum image density of the light emitting devices in said device row.

12. The light quantity adjustment device according to claim 1, wherein:
the light quantity measuring section measures the quantity of the light emission from each of the plurality of the light emitting devices by sequentially scanning the arranged light emitting devices in the primary scanning direction.

13. The light quantity adjustment device according to claim 12, wherein:
the adjustment quantity computing section computes the adjustment quantity so that the calculated image density of each of the plurality of the light emitting devices in a device row becomes substantially equal to a calculated minimum image density of the light emitting devices in said device row.

14. The light quantity adjustment device according to claim 1, wherein:
when the light quantity measuring section sequentially scans the plurality of the light emitting devices in the primary scanning direction, the light emitting devices arc sequentially illuminated in synchronization with the scanning.

15. The light quantity adjustment device according to claim 14, wherein:
the adjustment quantity computing section computes the adjustment quantity so that the calculated image density of each of the plurality of the light emitting devices in a device row becomes substantially equal to a calculated minimum image density of the light emitting devices of said device row.

16. The light quantity adjustment device according to claim 1, wherein:
the light quantity measuring section illuminates at one time all of or part of the plurality of the light emitting devices of a device row and measures the light quantity of the illuminated light emitting devices substantially simultaneously.

17. The light quantity adjustment device according to claim 16, wherein:
the adjustment quantity computing section computes the adjustment quantity so that the calculated image density of each of the plurality of the light emitting devices in a device row becomes substantially equal to a calculated minimum image density of the light emitting devices of said device row.

18. The light quantity adjustment device according to claim 1, wherein:
an organic electroluminescence device comprises a plurality of light emitting sections, each of which corresponds to one of the light emitting devices.

19. The light quantity adjustment device according to claim 1, wherein:
the light quantity measurement section further comprises a line CCD.

20. The light quantity adjustment device according to claim 1, wherein:
the sensitivity characteristics of the photosensitive material are such that the image density increases linearly with a logarithm of an exposure energy.

21. The light quantity adjustment device according to claim 20, wherein:
n light emitting sections are provided with respect to n exposure pixels, and a density $A_n$, of an nth pixel is obtained by performing a calculation according to an equation $$A_n = \int D_n(x)dx = \int f(E_n)dx = \int f(P_n(x) \cdot t_n)dx, \text{ wherein}$$

$D_n(x)$ is a density distribution of the nth pixel, $E_n(x)$ is a distribution of an exposure quantity of the nth pixel, $P_n(x)$ is a light quantity distribution of the nth pixel, and $t_n$ is an exposure time of the nth pixel.

22. A light quantity adjustment device, comprising:
a light quantity measuring section for measuring a quantity of light emission from each of a plurality of light emitting devices in a light emitting device array in which a plurality of light emitting devices are arranged in a primary scanning direction to form a device row and a plurality of the device rows are arranged in a secondary scanning direction;
an adjustment quantity computing section for computing an adjustment quantity required for adjusting the quantity of light emission based on an image density calculated from the measured quantity of the light emission and sensitivity characteristics of a photosensitive material to be exposed so that the calculated image density of each of the light emitting devices in a device row become substantially equal to each other; and
a light quantity adjustment section for adjusting the quantity of the light emission based on the computed adjustment quantity, wherein,
the adjustment quantity computing section computes the adjustment quantity so that the calculated image density of each of the light emitting devices of a device row becomes substantially equal to a calculated minimum image density of the light emitting devices of said device row.

23. The light quantity adjustment device according to claim 22, wherein:
the light quantity measuring section sequentially scans the plurality of arranged light emitting devices in the primary scanning direction and measures the quantity of the light emission from each of the light emitting devices at a higher resolution than a pitch of the light emitting devices within the device rows; and
when the light quantity measuring section sequentially scans the plurality of the light emitting devices in the primary scanning direction, the light emitting devices are sequentially illuminated in synchronization with the scanning.

24. A light quantity adjustment method, comprising:
measuring a quantity of light emission from each of a plurality of light emitting devices in a light emitting device array, in which a plurality of the light emitting devices are arranged in a primary scanning direction to form a device row and a plurality of the device rows are arranged in a secondary scanning direction;
computing an adjustment quantity required for adjusting the quantity of the light emission based on an image density calculated from the measured quantity of the light emission and sensitivity characteristics of a photosensitive material to be exposed so that the calculated image density of each of the light emitting devices in a device row become substantially equal to each other; and
adjusting the quantity of the light emission based on the computed adjustment quantity.

25. An exposure apparatus, comprising:
a light emitting device array in which a plurality of light emitting devices are arranged in a primary scanning direction to form a device row, and a plurality of the device rows are arranged in a secondary scanning direction;
a light quantity measuring device for measuring a quantity of light emission of each of the light emitting devices in the light emitting device array;
an adjustment quantity computing section for computing an adjustment quantity required for adjusting the quantity of the light emission based on the image density calculated from the measured quantity of the light emission and sensitivity characteristics of a exposed photosensitive material to be exposed so that calculated image density of each of the light emitting devices in a device row become substantially equal to each other; and
a light quantity adjustment section for adjusting the quantity of the light emission based on the computed adjustment quantity.

* * * * *